No. 804,057. PATENTED NOV. 7, 1905.
G. C. SCOTT.
POULTRY FEEDING APPARATUS.
APPLICATION FILED FEB. 27, 1904.
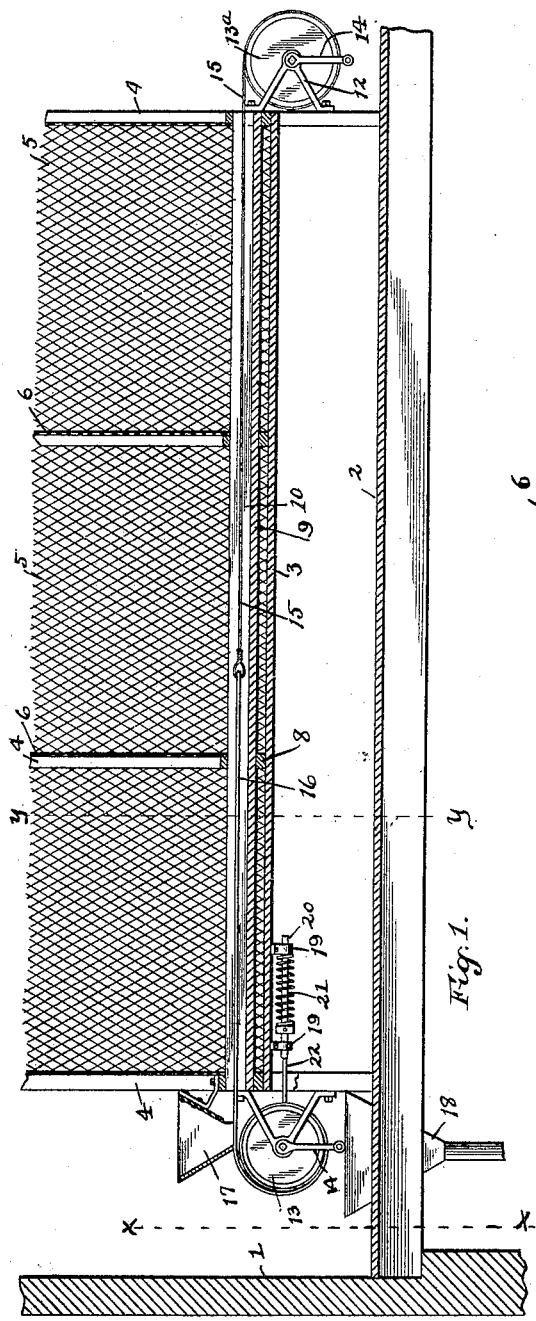
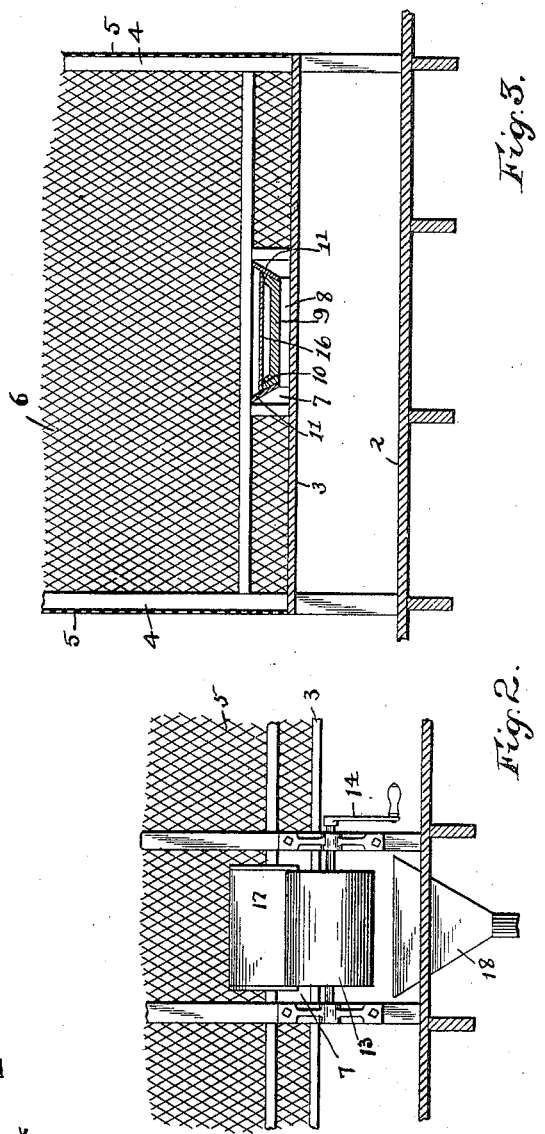
WITNESSES:
H. B. Bradshaw
A. L. Phelps
INVENTOR
Gerard C. Scott
BY
Shepherd & Parker
ATTORNEYS

UNITED STATES PATENT OFFICE.

GERARD C. SCOTT, OF COLUMBUS, OHIO.

POULTRY-FEEDING APPARATUS.

No. 804,057.   Specification of Letters Patent.   Patented Nov. 7, 1905.

Application filed February 27, 1904. Serial No. 195,690.

*To all whom it may concern:*

Be it known that I, GERARD C. SCOTT, a citizen of the United States, residing at Columbus, in the county of Franklin and State of Ohio, have invented a certain new and useful Improvement in Poultry-Feeding Apparatus, of which the following is a specification.

My invention relates to the improvement of poultry-houses, and has particular relation to that class of poultry-houses in which a plurality of compartments are provided in a single structure.

The object of my invention is to provide improved and novel means for supplying the fowls contained in the compartments of the structure with food. This object I accomplish in the manner illustrated in the accompanying drawings, in which—

Figure 1 is a central longitudinal section through a row of poultry-containing compartments, showing my improved means in connection therewith for supplying food to the occupants of the compartments. Fig. 2 is a sectional view on line $x\,x$ of Fig. 1, and Fig. 3 is a similar sectional view on line $y\,y$ of Fig. 1.

Similar numerals refer to similar parts throughout the several views.

1 represents a portion of one of the vertical walls of a suitably-constructed building, of which 2 is the floor thereof. Within said building I provide a poultry-house structure comprising a suitable floor member 3, preferably elevated above the floor 2 and from which rise suitable frame-standards 4. The sides and ends of the structure thus formed may be suitably covered by wire-netting or other desirable material 5, and the elongated structure thus provided may be subdivided into compartments by providing transverse partitions 6, which are also preferably of wire-netting. These partitions are provided in their lower portions with opposing openings 7, similar and oppositely-located openings being formed in the end framework of the structure. Mounted centrally of the structure on suitable supports 8, which rise from the floor 3 thereof, is a longitudinally-arranged plate 9, the latter having upturned and outwardly-inclined edge portions 10. To these edge portions are fixed correspondingly-inclined side boards or extensions 11, thus providing a substantially trough-like structure which runs through the partition-openings 7 and extends throughout the length of the compartment structure. At each end of the compartment structure I journal in suitable brackets 12 a reel or windlass body, the latter being indicated at 13 and 13$^a$, one of the end shafts or spindles of each of said windlass-bodies being provided with a crank-handle 14 or other suitable means for imparting rotary movement to said windlass-bodies. With the windlass-body 13$^a$ is connected one end of a wire 15, said wire being equal to the length of the compartment structure and having its remaining end connected with one end of a flexible strip 16, said strip being adapted, as shown, to run through the lower portion of the various compartments and through the openings 7 in the partitions thereof. As indicated in the drawings, the strip 16 is designed to be wound upon the reel or windlass body 13. On the outer side of the compartment structure and above the windlass 13 I support a suitable hopper 17, which is designed to discharge its contents upon the flexible feed-strip 16. I also provide beneath the reel 13 a suitable discharge-hopper 18, the upper open mouth of which is designed to receive material discharged from the strip 16 or scrape therefrom in the manner hereinafter described. This scraping operation is preferably conducted by mounting in bearing-brackets 19, which depend from the under side of the floor 3, a rod 20, which is normally pressed forward by a spring 21 and which has an outer terminating scraper-plate 22, the latter being held by the spring 21 in desirable engagement with the surface of the strip 16 when the latter is wound upon the windlass 13.

It will be noticed by reference to the drawings that the flexible strip 16 is designed to be supported to travel upon the comparatively narrow upper edge portions of the side flanges 10 of the plate 9 and that said flexible strip is thus contained between the side pieces 11 of the trough-like structure heretofore described.

In utilizing my invention the food to be conveyed to the fowls is intended to be discharged from the hopper 17 onto the moving flexible strip 16, the latter or its wire connection 15 being wound upon the reel 13$^a$ until the food-laden strip is accessible to the fowls contained in the compartments. When the strip is drawn back and wound upon the reel 13 for the purpose of reloading the strip, it is obvious that such material as may be scraped therefrom by the action of the scraper 22 or by contact with the outer side of the hopper 17 may drop into the discharge-hopper 18 and conveyed therefrom to any suitable discharging-point.

From the construction and operation described it will readily be understood that simple and reliable means are provided for furnishing one or more poultry-containing compartments with a supply of food and for withdrawing and reloading the food supporting and conveying strip.

Although I have shown herein and described particular constructions for loading and cleaning the food conveying and supporting strip, it will be understood that I do not contemplate at this time the limitation of my invention to such construction. It will also be understood that the means herein claimed for the feeding of poultry may be utilized for the feeding of other animals.

Having now fully described my invention, what I claim, and desire to secure by Letters Patent, is—

1. In a poultry-feeding apparatus, the combination with a poultry-containing structure and a feed-hopper supported adjacent thereto, of a flexible strip running through said structure, devices rotatably mounted at the opposite ends of said structure for winding said strip thereon, and means for scraping the strip.

2. In a poultry-feeding apparatus, the combination with a poultry-containing structure and a feed-hopper supported adjacent thereto, of a flexible strip running through said structure, devices rotatably mounted at the opposite ends of said structure for winding said strip thereon, and spring-actuated means for scraping the strip.

GERARD C. SCOTT.

In presence of—
A. L. PHELPS,
W. L. MORROW.